(12) United States Patent
Nanni (10) Patent No.: US 12,021,198 B2
(45) Date of Patent: Jun. 25, 2024

(54) METHOD AND APPARATUS FOR ASSEMBLING ELECTRODES

(71) Applicant: MANZ ITALY S.R.L., Sasso Marconi (IT)

(72) Inventor: Fabrizio Nanni, Sasso Marconi (IT)

(73) Assignee: MANZ ITALY S.R.L., Sasso Marconi (IT)

( * ) Notice: Subject to any disclaimer, the term of this patent is extended or adjusted under 35 U.S.C. 154(b) by 403 days.

(21) Appl. No.: 16/641,532

(22) PCT Filed: Aug. 6, 2018

(86) PCT No.: PCT/IB2018/055909
§ 371 (c)(1),
(2) Date: Feb. 24, 2020

(87) PCT Pub. No.: WO2019/053530
PCT Pub. Date: Mar. 21, 2019

(65) Prior Publication Data
US 2021/0408609 A1    Dec. 30, 2021

(30) Foreign Application Priority Data

Sep. 15, 2017  (IT) .................. 102017000103755

(51) Int. Cl.
*H01M 10/0587* (2010.01)
*H01M 10/04* (2006.01)
*H01M 10/052* (2010.01)

(52) U.S. Cl.
CPC ... *H01M 10/0587* (2013.01); *H01M 10/0409* (2013.01); *H01M 10/052* (2013.01)

(58) Field of Classification Search
CPC .......... H01M 10/0409; H01M 10/058; H01M 10/0587; H01M 10/0583; H01M 10/0404; H01G 13/02
See application file for complete search history.

(56) References Cited

U.S. PATENT DOCUMENTS

| 11,728,504 B2* | 8/2023 | Alongi .............. H01M 10/0436 29/623.1 |
| 2009/0165936 A1* | 7/2009 | Sakata .............. H01M 10/0431 156/227 |

(Continued)

FOREIGN PATENT DOCUMENTS

| CN | 101796684 A | 8/2010 |
| CN | 102769146 A | 11/2012 |

(Continued)

OTHER PUBLICATIONS

Cong Li (CN 102769146A)—machine translation of description; foreign document cited and provided in Feb. 2, 2024 IDS (Year: 2012).*

(Continued)

*Primary Examiner* — Matthew T Martin
*Assistant Examiner* — Jessie Walls-Murray
(74) *Attorney, Agent, or Firm* — Leason Ellis LLP (57) ABSTRACT

A method for forming electrodes assemblies, used for producing secondary lithium batteries, comprises the steps of feeding two separator strips with continuous feed motions, inserting between the two strips a succession of anodes at reciprocal distances that progressively increase, arranging a succession of cathodes, either all on an outer side of a strip, or alternating a cathode on an outer side of a strip and a cathode on an outer side of the other strip, such that on each single anode a single cathode is superimposed with the interposition of one of the two strips; strips, cathodes and anodes are then laminated together, the laminated product is wound in a single winding direction and the wound product is separated from the rest of the laminated product to enable a subsequent electrodes assembly to be formed.

9 Claims, 9 Drawing Sheets

(56) References Cited

U.S. PATENT DOCUMENTS

| | | | |
|---|---|---|---|
| 2009/0239133 A1 | 9/2009 | Kosugi | |
| 2011/0104567 A1* | 5/2011 | Lee | H01M 10/125 429/211 |
| 2011/0274960 A1* | 11/2011 | Ahn | H01M 50/403 29/623.2 |
| 2012/0033345 A1 | 2/2012 | Min et al. | |
| 2013/0143088 A1* | 6/2013 | Cho | H01M 10/0525 29/874 |
| 2013/0189569 A1* | 7/2013 | Youm | H01M 10/0583 429/185 |
| 2014/0087224 A1* | 3/2014 | Kim | H01M 10/0587 429/246 |
| 2014/0255756 A1* | 9/2014 | Kwon | H01M 10/052 429/149 |
| 2017/0125850 A1* | 5/2017 | Kim | B65H 75/08 |
| 2017/0162913 A1* | 6/2017 | Ohashi | H01M 50/434 |
| 2020/0243894 A1* | 7/2020 | Lee | H01M 10/0459 |

FOREIGN PATENT DOCUMENTS

| | | | |
|---|---|---|---|
| CN | 102986078 A | 3/2013 | |
| CN | 105359323 A | 2/2016 | |
| CN | 205543121 U | 8/2016 | |
| EP | 2 256 853 | 12/2010 | |
| JP | 2013524431 | 6/2013 | |
| JP | 2014526133 | 10/2014 | |
| KR | 10-2004-0005898 A | 1/2004 | |
| KR | 2008 0095967 | 10/2008 | |
| KR | 20080095967 A | 10/2008 | |
| WO | WO 2009/078632 | 6/2009 | |
| WO | WO-2014017864 A1 * | 1/2014 | ........ H01M 10/0459 |

OTHER PUBLICATIONS

KR Notice of Final Rejection in KR Application No. 10-2020-7010905, mailed Feb. 22, 2024, an English Translation attached hereto (9 pages).

* cited by examiner

METHOD AND APPARATUS FOR ASSEMBLING ELECTRODES

CROSS-REFERENCE TO RELATED PATENT APPLICATIONS

This application is a U.S. National Phase Application under 35 U.S.C. § 371 of International Patent Application No. PCT/IB2018/055909, filed Aug. 6, 2018, which claims the priority of Italian Patent Application No. 102017000103755, filed Sep. 15, 2017, all of which are incorporated by reference, as if expressly set forth in their respective entireties herein.

BACKGROUND OF THE INVENTION

The invention relates to a method and an apparatus for assembling electrodes for producing electric energy storage devices. The invention further relates to an electrodes assembly, in particular obtained by the aforesaid assembly method and/or the aforesaid assembly apparatus.

Specifically, but not exclusively, the invention can be applied to producing secondary lithium batteries.

In particular, reference is made to electrodes assembly by stack winding technology, in which the electrodes (cathodes and anodes) are arranged in succession on a strip of separator that is then wound so that in the product resulting from winding the electrodes are stacked on one another, alternating cathodes and anodes. Each electrode has a tab that in the wound product has to be correctly superimposed on the tabs of the electrodes with the same polarity.

The prior art comprises patent publication EP 2 750 241 A1 that shows an electrodes assembly comprising an electrodes laminate consisting of a plurality of electrode units rolled and stacked on one another together with two rectangle-shaped separating films.

Patent publications US 2012/033345 A1 and KR 2008 0095967 A show methods for forming electrode assemblies in which electrodes with a polarity are inserted between two separator tapes and electrodes of opposite polarity are disposed on one of the two separator tapes.

Various aspects of the prior art are improvable.

In the first place, it is desirable to provide an assembly method with great productivity ensuring at the same time high quality of the end-product.

In the second place, it is desirable for there to always be a correct and precise mutual superimposition of the electrode tabs of the same polarity in the wound product, taking account of the fact that the dimensions of the wound product increase progressively over the course of winding.

SUMMARY OF THE INVENTION

One object of the invention is to provide an electrodes assembly by stack winding, for producing an electric energy storage device, which is able to solve one or more of the aforesaid problems of the prior art.

One advantage is to ensure correct and precise reciprocal superimposing of the electrode tabs of the same polarity in the wound product.

One advantage is to make an apparatus and/or a method for the electrodes assembly that has great productivity.

One advantage is to permit the production of electric energy storage devices of high quality and with high efficiency.

One advantage is to make available a constructionally cheap and simple apparatus for assembling electrodes, in particular for producing electric energy storage devices such as, for example, lithium batteries.

One advantage is to reduce the production costs of electric energy storage devices, in particular of lithium batteries.

One advantage is to increase the packaging density of the electric energy storage device, in particular of the lithium battery.

One advantage is to enable a process to be implemented of electrodes assembly with continuous advancement of the materials.

One advantage is to provide an electric energy storage device with relatively high volumetric efficiency and energy density.

One advantage is to give rise to an electrodes assembly, in particular for lithium batteries, with a self-supporting structure.

One advantage is to reduce the risk of imperfections (for example wrinkling) in the assembled product.

One advantage is to give rise to an electrodes assembly for an electric energy storage device provided with great integrity and safety.

Such objects and advantages and still others are achieved by a method and/or by an apparatus and/or by an assembly according to one or more of the claims set out below.

In one embodiment, a method for forming electrodes assemblies comprises the following steps: feeding two strips of separator with continuous feed motions; inserting between said two strips a succession of inner electrodes (with the same polarity, for example anodes) one after the other at reciprocal distances that progressively increase; arranging a succession of outer electrodes (with opposite polarity, for example cathodes), or all on an outer side of a strip, or alternating an electrode on an outer side of a strip and an electrode on an outer side of the other strip, in such a manner that on each inner electrode a single outer electrode is superimposed with the interposition of one of the two strips; laminating together the strips and the electrodes; winding the laminated product in a single winding direction; separating the wound product from the rest of the laminated product to enable the next electrodes assembly to be formed.

BRIEF DESCRIPTION OF THE DRAWINGS

The invention can be better understood and implemented with reference to the enclosed drawings that illustrate embodiments thereof by way of non-limiting examples, in which.

DETAILED DESCRIPTION

For the sake of greater clarity and simplicity, analogous elements of different embodiments have been indicated by the same numbering.

With 1, overall, an apparatus has been indicated for assembling electrodes for producing electric energy storage devices, in particular for producing cells of secondary lithium batteries.

The assembly apparatus 1 may comprise, in particular, a first feed path with continuous motion of a first continuous separator strip S1. The assembly apparatus 1 may comprise, in particular, a second feed path with continuous motion of a second continuous separator strip S2. The two paths may converge, as in these embodiments, in an operating portion in which the first strip S1 and the second strip S2 are at least partially superimposed on one another.

Each of the two paths may comprise, for example, a reel (not shown) for unwinding the respective strip S1 or S2 and/or guiding and sliding means for guiding and sliding the strip (for example support rollers, transmission rollers, etc, which are not illustrated) and/or tensioning means for tensioning the strip (for example tensioning rollers, tightening pulleys, anti-deflection rollers, etc, which are not illustrated), etc. The various elements that make up the two paths of the strips S1 and S2 could also be elements of known type, for which reason they have not been shown and will not be disclosed in greater detail.

The assembly apparatus 1 may comprise, in particular, inserting means for inserting a succession of at least N electrodes A1, A2, A3, . . . , AN with first polarity between the first strip S1 and the second strip S2. The first polarity may be, as in these embodiments, negative, for the construction of galvanic cells (the electrodes A1, A2, A3, etc, will be anodes).

Figure 1:
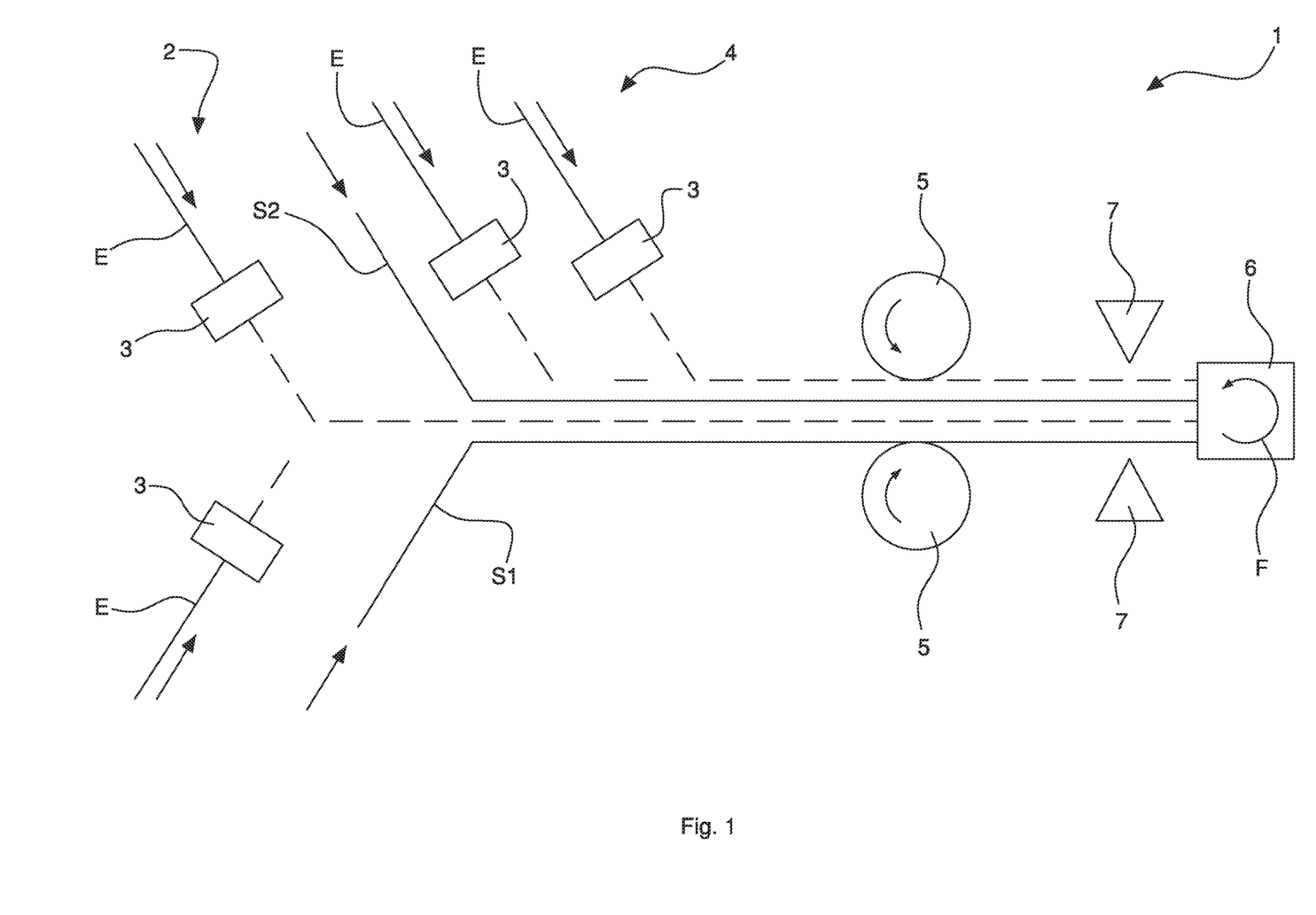
FIG. 1 is a diagram of a first embodiment of an assembly apparatus that is suitable for assembling electrodes for producing electric energy storage devices, according to the present invention.
Figure 2:
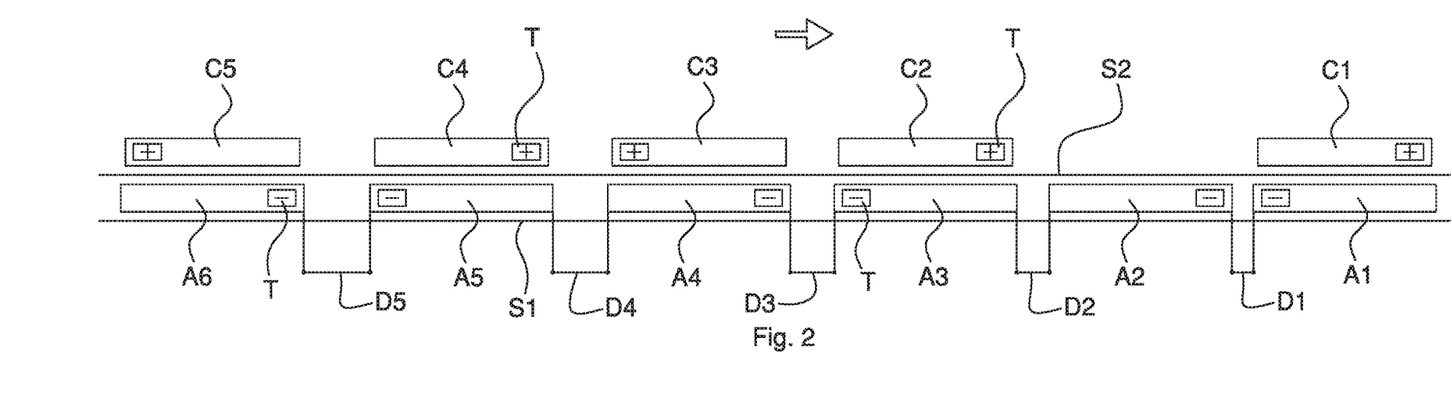
FIGS. 2 to 5 show four steps in sequence of a method for forming electrodes assemblies for electric energy storage devices, made according to the present invention using, in particular, the apparatus of FIG. 1.
Figure 3:
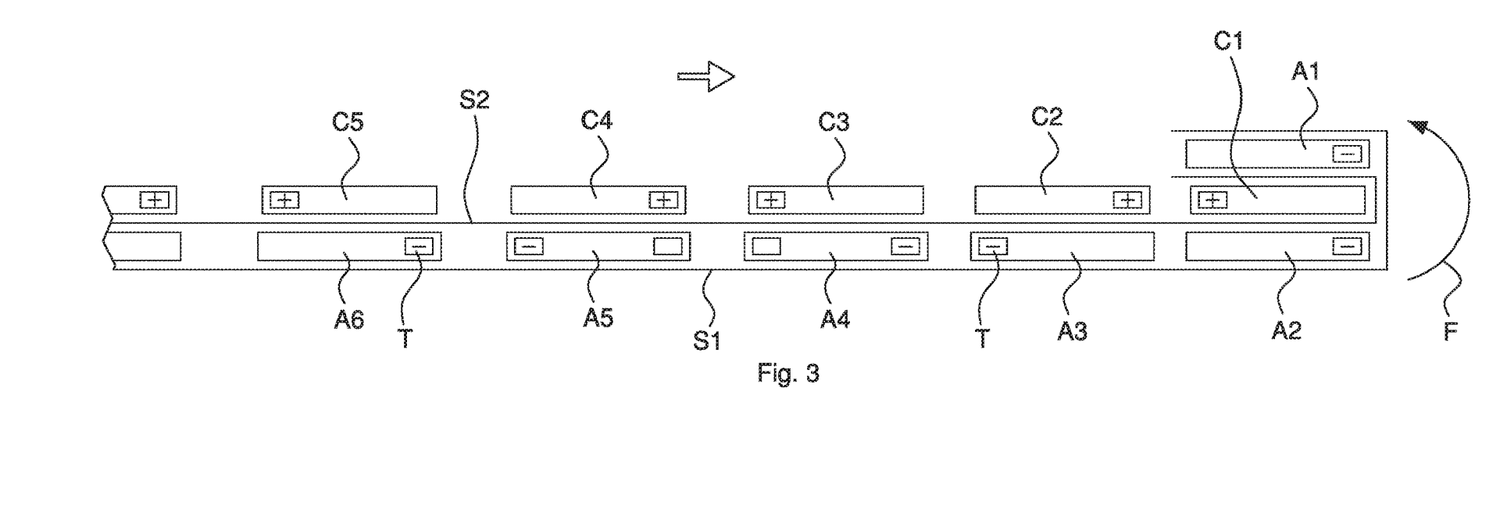
Figure 4:
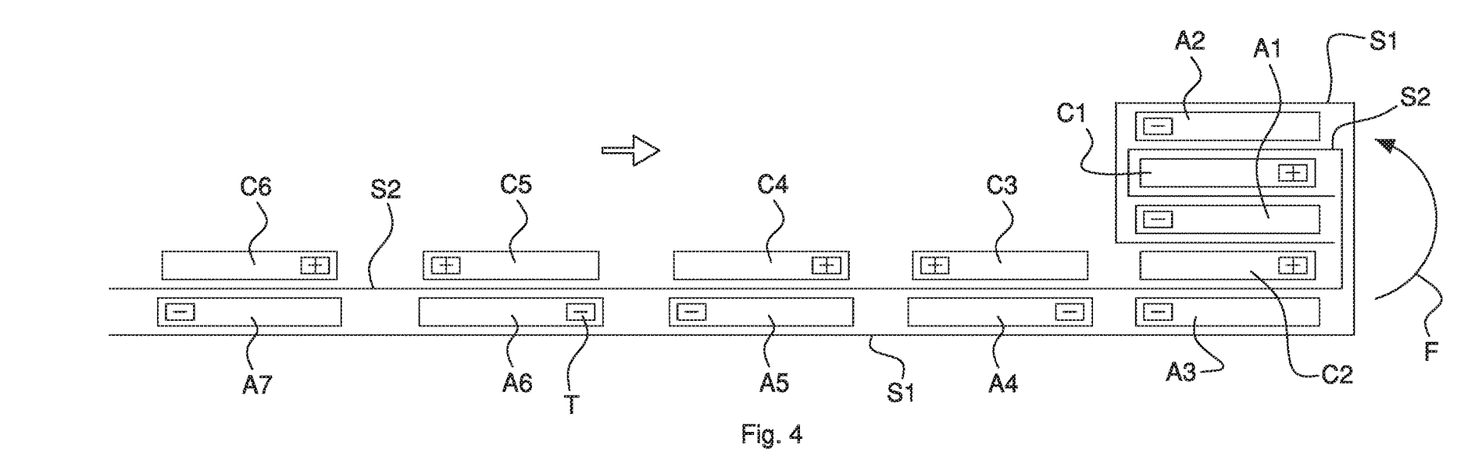
Figure 5:
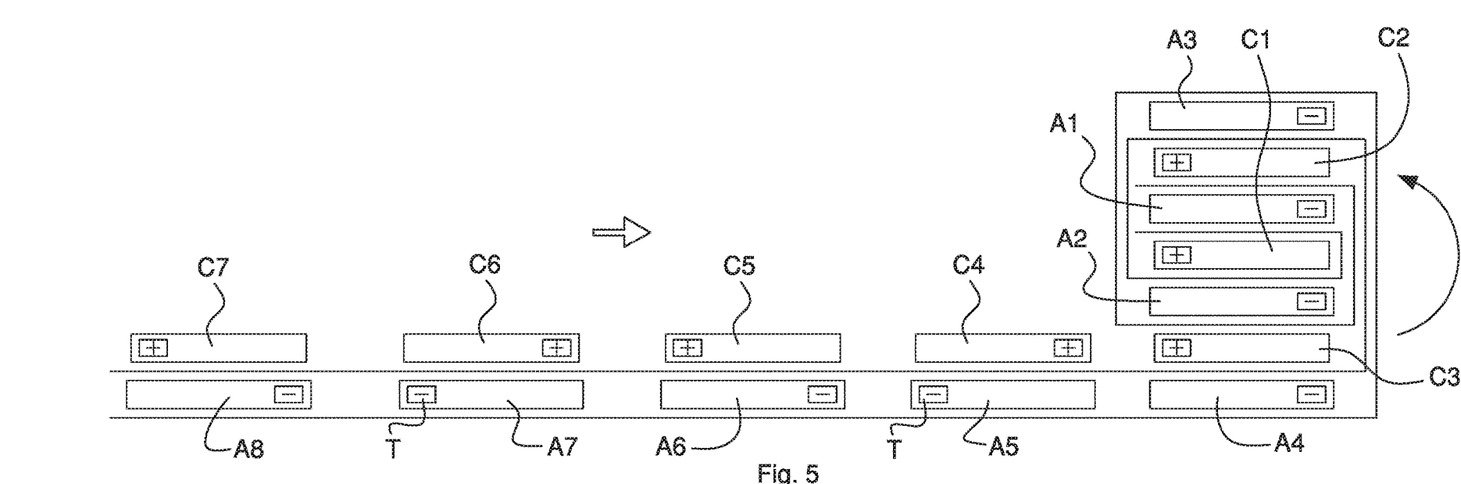
Figure 7:
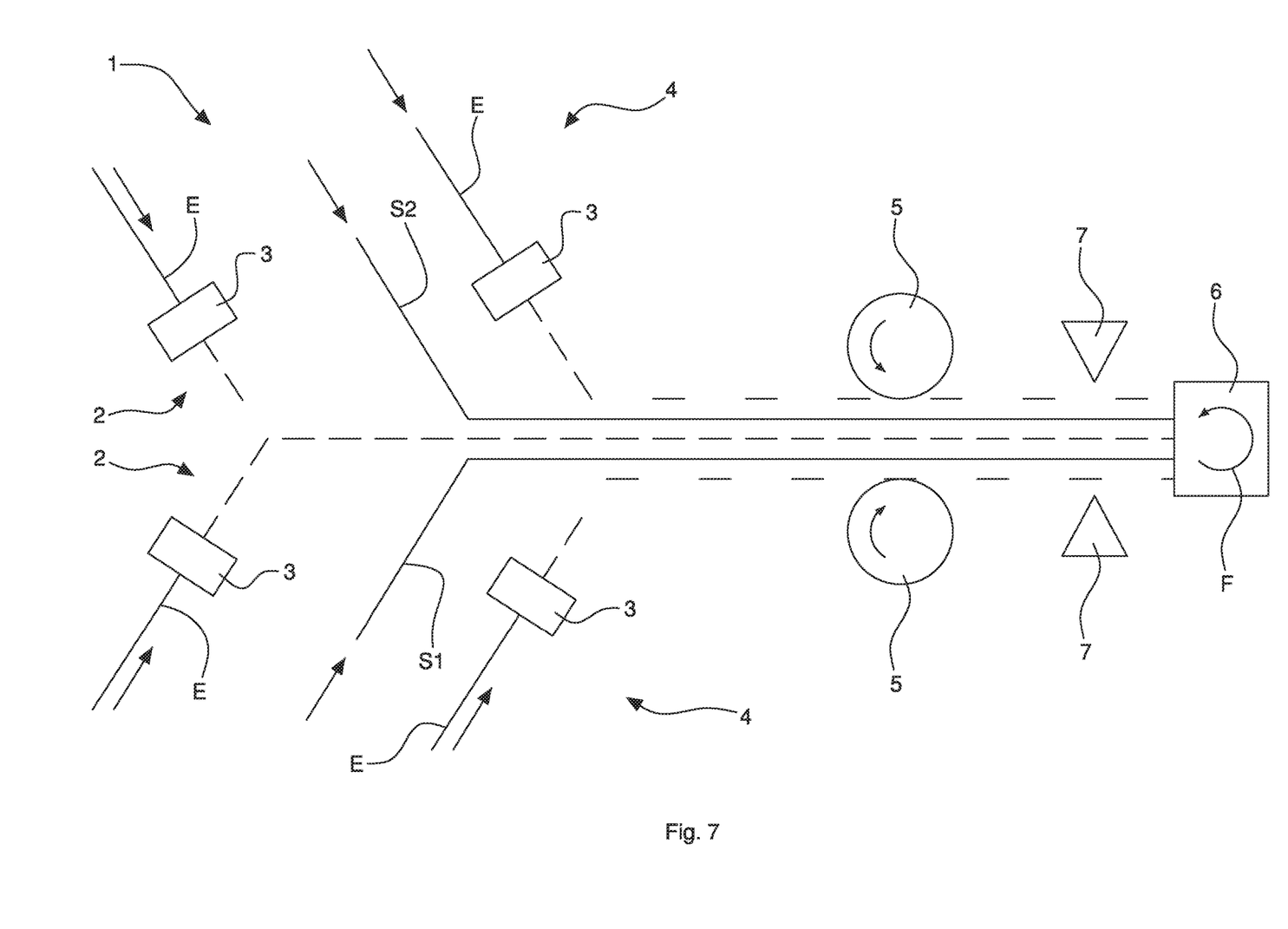
FIG. 7 is a diagram of a second embodiment of an assembly apparatus that is suitable for assembling electrodes for producing electric energy storage devices, according to the present invention.
Figure 8:
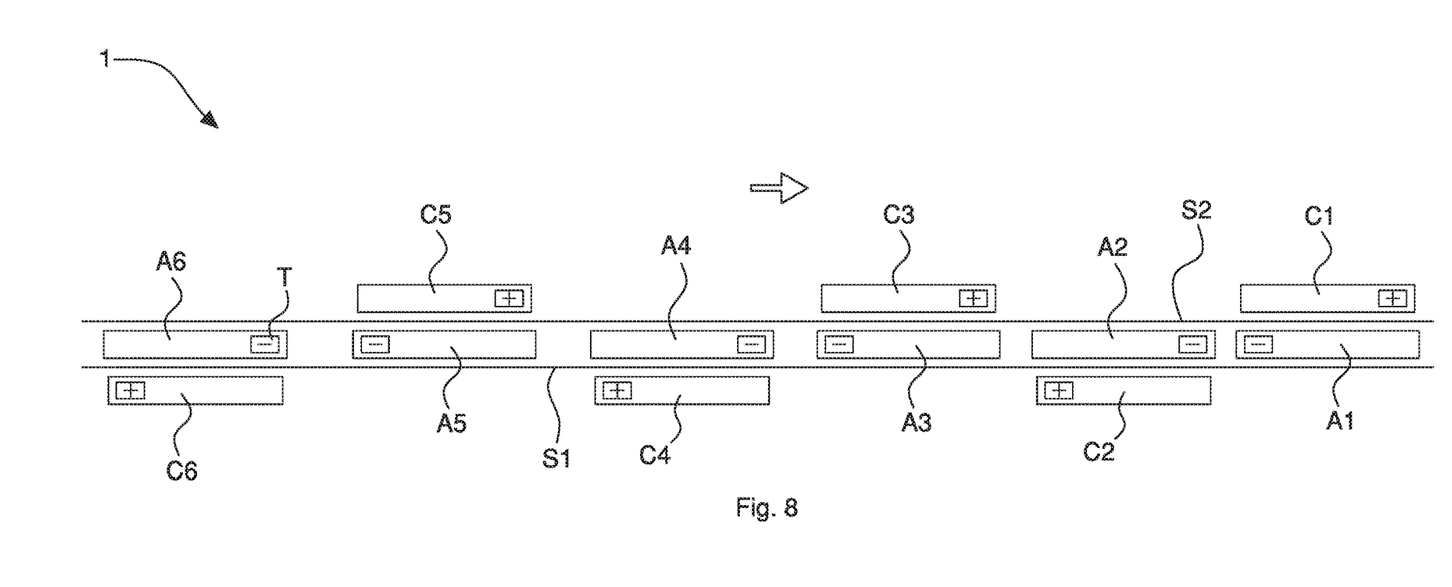
FIGS. 8 to 11 show four steps in sequence of a method for forming electrodes assemblies for electric energy storage devices, made according to the present invention using, in particular, the apparatus of FIG. 7.
Figure 9:
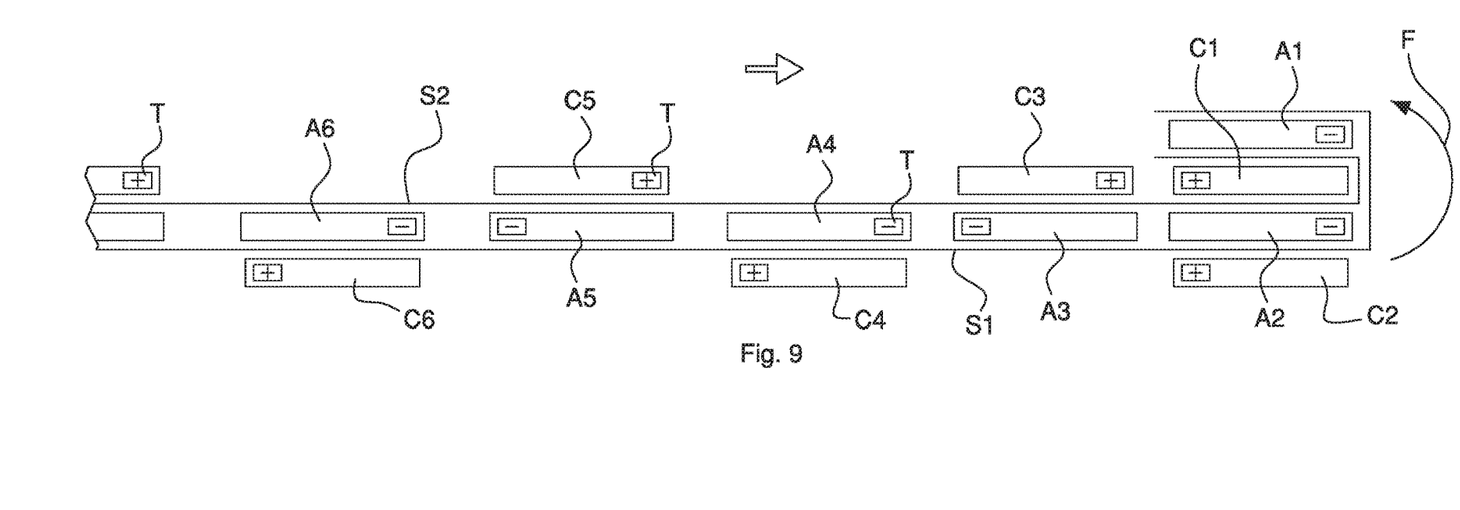
Figure 10:
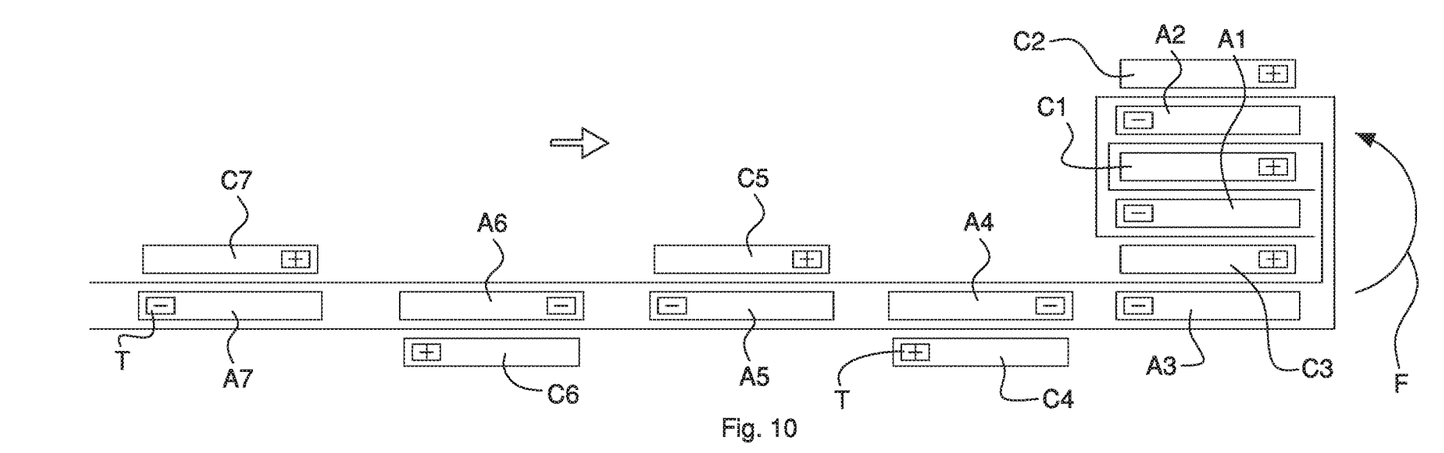
Figure 11:
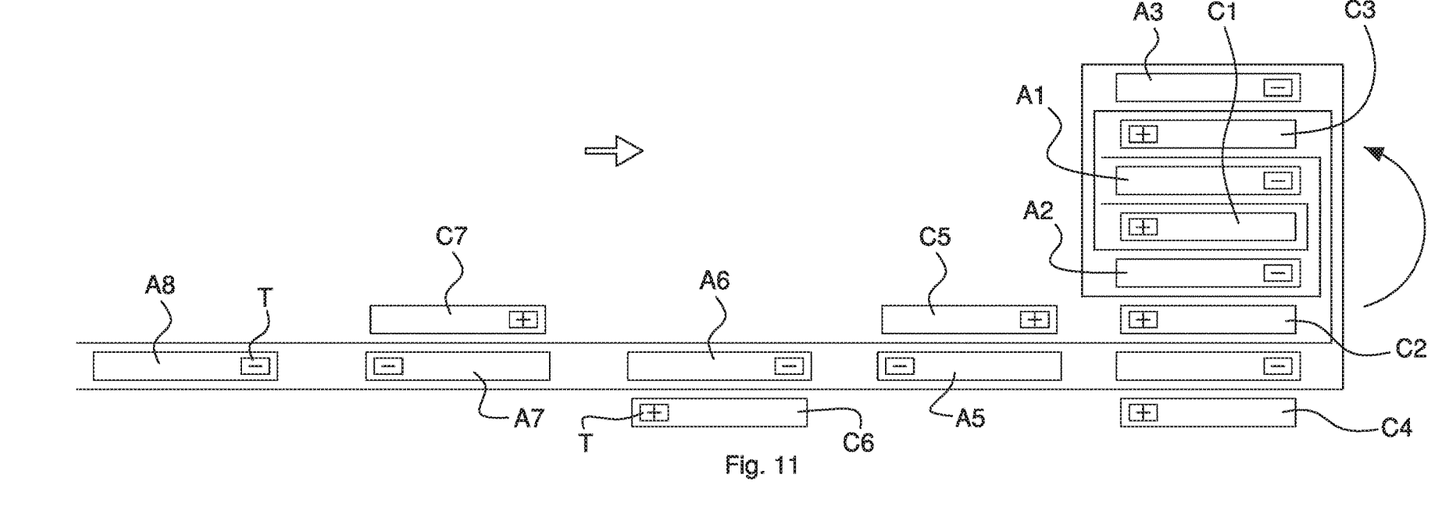

The inserting means may comprise, as in the embodiments in FIGS. 1 and 7, two distinct inserting devices 2 that are suitable for inserting the electrodes with a first polarity (anodes) in an alternating manner with respect to one another, so that one of the two inserting devices 2 may be configured for inserting the electrodes in an uneven ordinal position A1, A3, A5, etc, whereas the other of the two inserting devices 2 may be configured for inserting the electrodes in an even ordinal position A2, A4, A6, etc.

Each inserting device 2 of the electrodes with first polarity may comprise, for example, a feed path of a continuous electrode strip E (for example unwound from a reel, not shown) to feed (with continuous feed motion) the electrode strip E to a cutting device 3 that is suitable for separating single electrodes from the continuous electrode strip E. Each inserting device 2 may be provided with means, for example of known type, for applying the single electrodes, in succession one after the other, between the two separators S1 and S2.

The assembly apparatus 1 may comprise, in particular, feeding means for arranging a succession of electrodes C1, C2, C3, . . . , C(N−1) with a second polarity, according selectively to two different arrangement modes: either according to a first mode (FIGS. 1 and 12), with all the electrodes C1, C2, etc., arranged on an outer side of the first strip S1, or, according to a second mode (FIG. 7), with a part of electrodes with a second polarity arranged on an outer side of the first strip S1 and another part arranged on an outer side of the second strip S2. The second polarity may be, as in these embodiments, positive, for the construction of galvanic cells (the electrodes C1, C2, C3, etc., cathodes).

The feeding means may comprise, as in the embodiments in FIGS. 1 and 7, two distinct feeding devices 4 suitable for arranging the electrodes with a second polarity C1, C2, C3, etc., (cathodes) alternatively in relation to one another, so that one of the two feeding devices 4 may be configured for inserting the electrodes in an uneven ordinal position C1, C3, C5, etc, whereas the other of the two feeding devices 4 may be configured for inserting the electrodes in an even ordinal position C2, C4, C6, etc.

The two distinct feeding devices 4 may be configured, in particular, as in the embodiment in FIG. 7, in which a first feeding device 4 is arranged to feed the electrodes with a second polarity (cathodes) on an outer side of the first strip S1 and a second feeding device 4 is arranged to feed the electrodes with a second polarity on an outer side of the second strip S2.

Each feeding device 4 of the electrodes with a second polarity may comprise, for example, a feed path of a continuous electrode strip E (for example unwound from a reel, not shown) that feeds (with continuous feed motion) the electrode strip E to a cutting device 3 that is suitable for separating single electrodes from the continuous electrode strip E. Each feeding device 4 may be provided with means, for example of known type, for applying the single electrodes, in succession one after the other, on the two separators S1 and S2, in the aforesaid first or second mode.

As said, the electrodes with first polarity A1, A2, A3, . . . , AN, may comprise, as in these embodiments, anodes and the electrodes with a second polarity C1, C2, C3, . . . , may comprise cathodes, even if it is possible to provide the opposite.

The assembly apparatus 1 may comprise, in particular, laminating means arranged on the aforesaid operating portion to couple together, by a laminating process, the first strip S1, the second strip S2, the electrodes A1, A2, A3, . . . , with first polarity (anodes) and the electrodes C1, C2, C3, . . . , with a second polarity (cathodes). This laminating means may comprise, in particular, laminating means of known type, for example one or more pairs of laminating rollers 5.

The assembly apparatus 1 may comprise, in particular, winding means 6 arranged on the aforesaid operating portion to wind in a single winding direction F the laminated product exiting the laminating means and make a wound product. The winding means 6 may comprise, in particular, winding means 6 of known type, for example means comprising a rotating spindle that rotates a gripping member of the laminated product.

The assembly apparatus 1 may comprise, in particular, separating means arranged, in particular, on the aforesaid operating portion, for example between the laminating means (rollers 5) and winding means 6, to separate the wound product from the rest of the laminated product and thus form a single electrodes assembly. Such separating means may comprise, in particular, separating means of known type, such as for example at least one cutting device 7 that is suitable for cutting the laminated product during continuous advancement of the laminated product, for example a cutting device 7 provided with a reciprocal forward and backward motion and with tools that adopt a closed cutting position for cutting the laminated product in the outward motion and an open rest position in the return motion to resume the initial position and permit the subsequent cut.

The assembly apparatus 1 may comprise, in particular, programmable electronic control means for controlling the various actuating means of the apparatus. The assembly apparatus 1 may further comprise sensor means (that is not shown) connected to the control means to control and/or ensure the correct operation of the apparatus 1. Such sensor means may comprise, for example, sensor means of optical type (for example image acquisition means) for checking the quality of the product and/or detecting possible irregularities during the process actuated by the apparatus 1, for example sensor means arranged at the outlet of the laminating means.

The assembly apparatus 1 according to the invention may be used, in particular, to implement a method for forming electrodes assemblies, in particular for producing electric energy storage devices (for example lithium batteries), which may comprise the operating steps disclosed below.

The assembly method may comprise, in particular, a step of feeding the first strip S1 of separator and the second strip S2 of separator, each with a continuous feed motion, along paths that converge on the operating portion in which the first strip S1 and the second strip S2 are (at least partially) superimposed on one another to permit coupling thereof.

The assembly method may comprise, in particular, a step of inserting between the two strips S1 and S2, for example during the aforesaid step of feeding the strips S1 and S2 continuously (i.e. whilst the strips S1 and S2 advance continuously, without interrupting the motion), a number N of electrodes with first polarity A1, A2, A3, . . . , AN, (anodes) one after the other, in order to form at least one first electrodes assembly, in which the reciprocal distances D1, D2, . . . , D(N−1) between the various electrodes A1, A2, A3, . . . , increase progressively from the first electrode with first polarity A1 (first anode of the electrodes assembly) to the last electrode with first polarity AN (last anode of the electrodes assembly).

In particular, the assembly apparatus 1 may be so programmed that the distance D1 between the first and the second electrode with first polarity A1 and A2 is less than the distance D2 between the second and the third electrode with first polarity A2 and A3 which will in turn be less than the distance D3 between the third and fourth electrode with first polarity A3 and A4, and so on until the last pairs of electrodes, so that the distance D(N−2) between the antepenultimate and penultimate electrode with first polarity A(N−2) and A(N−1) will be less than the distance D(N−1) between the penultimate and the last electrode with first polarity A(N−1) and A(N), before restarting with another arrangement of electrodes A1, A2, A3, etc., to form the next electrodes assembly (in symbols we will have D1<D2<D3<<D(N−2)<D(N−1), with N>2, or N>3, or N>4, or N>5, or N>6, or N>7, or N>8).

The assembly method may comprise, in particular, a step of arranging a succession of electrodes with a second polarity C1, C2, C3, . . . , (cathodes) in particular during the aforesaid step of feeding the strips S1 and S2 continuously, in which the second polarity is opposite the first polarity, to form, selectively, a first or a second arrangement of electrodes with a second polarity C1, C2, C3, etc.

In the case of the first arrangement (FIGS. 1 and 12 and FIGS. 2 to 5), the electrodes with a second polarity C1, C2, C3, . . . , are so arranged on an outer side of the first strip S1 that on each electrode with first polarity A1, A2, A3, . . . , AN a single electrode with a second polarity C1, C2, C3, is superimposed . . . , with the interposing of the first strip S1, except for the first or second electrode with first polarity A1 or A2 (in the specific embodiment the second electrode A2 with first polarity), at which no electrode with a second polarity is superimposed, but an empty space is left.

In the case of the second arrangement (FIG. 7 and FIGS. 8 to 11), the electrodes with a second polarity C1, C2, C3, . . . , are arranged alternatingly on an outer side of the first strip S1 and on an outer side of the second strip S2, such that on each electrode with first polarity in an uneven ordinal position A1, A3, . . . , a single electrode with a second polarity C1, C3, . . . is interposed, with the interposing of the first strip S1, and such that on electrodes with first polarity in an even ordinal position A2, A4, . . . , a single electrode with a second polarity C2, C4, . . . is interposed, with the interposing of the second strip S2. It is in particular possible to ensure that at the last or penultimate electrode with first polarity AN or A(N−1) an empty space is left, so that at the end of the winding an electrode assembly is obtained that comprises two electrodes of the same polarity (A1 and AN) at the two opposite ends, at the first and last place. In the specific embodiment (in which the number N is even) an empty space has been left, without superimposing any electrode at the last electrode A8; in the case of an uneven number N, an empty space could be left, without superimposing any electrode, at the penultimate electrode A(N−1).

The assembly method may comprise, in particular, after the aforesaid steps of inserting electrodes with first polarity A1, A2, A3, . . . , AN and arranging electrodes with a second polarity C1, C2, C3, . . . , a step of laminating together the first strip S1, the second strip S2 and the electrodes with first polarity A1, A2, etc., and with a second polarity C1, C2, etc., for making a laminated product.

The assembly method may comprise, in particular, a step of winding the laminated product in a single winding direction F so as to make a wound product that comprises a stack of electrodes with first polarity A1, A2, A3, . . . , AN that are alternately superimposed with electrodes with a second polarity C1, C2, C3, . . . , with alternating interposing of the first strip S1 and of the second strip S2.

The assembly method may comprise, in particular, a step of separating the wound product from the rest of the laminated product to enable a subsequent electrodes assembly to be formed.

For every single electrodes assembly, the number N of electrodes with first polarity A1, A2, A3, . . . , AN may be a number greater than 2, or greater than 3, or greater than 4, or greater than 5, or greater than 6, or greater than 7, or greater than 8. In the specific embodiments illustrated here, the number N is equal to 8.

For each single electrodes assembly, the total number of electrodes with a second polarity C1, C2, etc., may be the same as N−1, in such a manner that in the wound end product the most external electrodes (the first and last of the stack) are electrodes A1 and A8 of the same polarity (first polarity, in particular negative).

Each electrode with first polarity A1, A2, A3, . . . , AN and with a second polarity C1, C2, C3 is provided with a tab T.

The aforesaid reciprocal distances D1, D2, D3, . . . , increase progressively from the first electrode with first polarity A1 to the last electrode with first polarity AN (and/or, likewise, between the electrodes with a second polarity) so that in the wound product the tabs T of electrodes of the same polarity are superimposed on one another precisely, taking account of the increase in volume of the product during winding. The aforesaid reciprocal distances have been taken with reference to the electrodes con first polarity (anodes), but could also be taken with reference to the electrodes with a second polarity (cathodes), without this substantially changing anything, as the absolute distances could be different, as the electrodes with first polarity (anodes) are normally slightly wider than the electrodes with a second polarity (cathodes), but the increases of the distances between the various pairs of electrodes would substantially remain the same.

In the specific embodiments illustrated, in which the tabs T are situated on one side of the electrodes with a non-central but eccentric arrangement (to the right or the left of the centre line or centre of the electrode), the electrodes of the same polarity with an odd ordinal position (for example A1, A3, A5, etc.) will have the tabs with the same eccentric arrangement (to the right or the left), whereas the electrodes of the same polarity with an even ordinal position (for example A2, A4, A6, etc.) will have tabs with the opposite eccentric arrangement (to the left or right).

Figure 13:
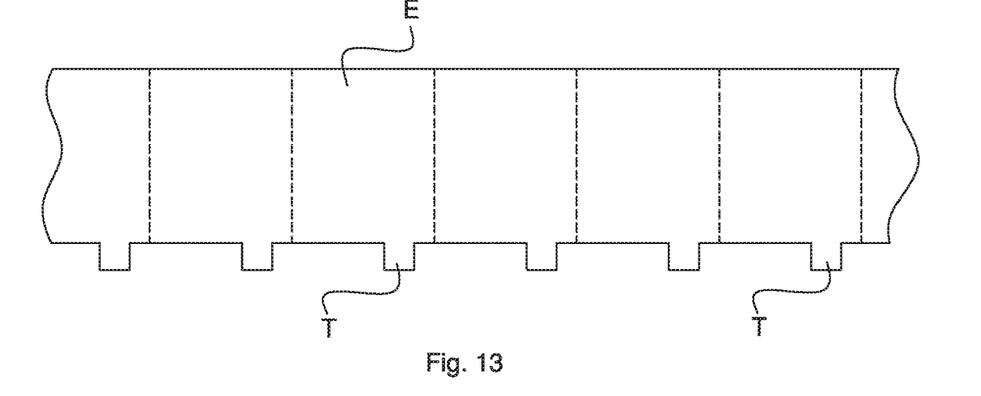
FIGS. 13 and 14 show two embodiments of continuous electrode strips E which are usable in the apparatuses of FIGS. 1 and 7.
Figure 14:
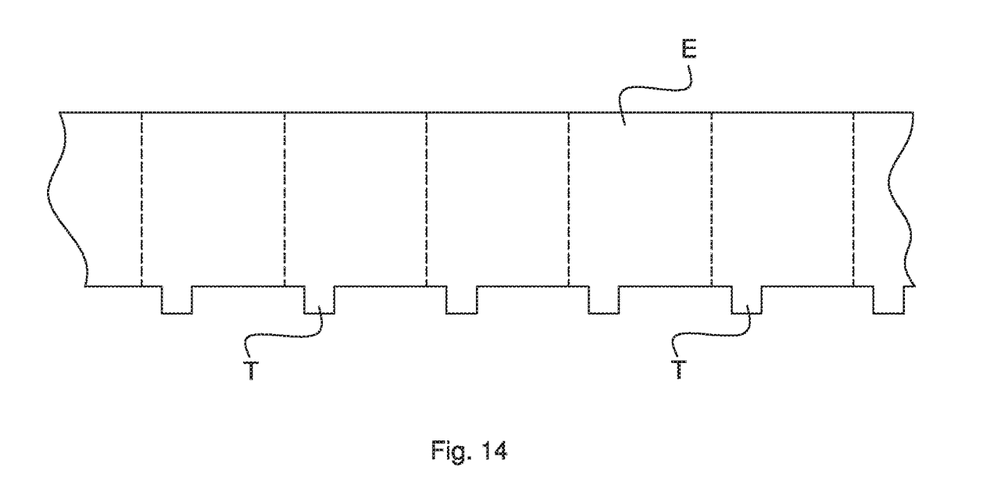

In FIGS. 13 and 14, two embodiments of electrode strips E are illustrated which are usable in the apparatuses of FIGS. 1 and 7 for each of the two inserting devices 2, in which the tabs T of each electrode strip E are arranged with a constant pitch, in such a manner that each continuous electrode strip E can be cut to obtain electrodes with the tabs T having the same eccentric arrangement (to the right or the left). With dashed lines, the future cutting lines are indicated at which the various cutting devices 3 will separate the single electrodes from the strips A.

Figure 12:
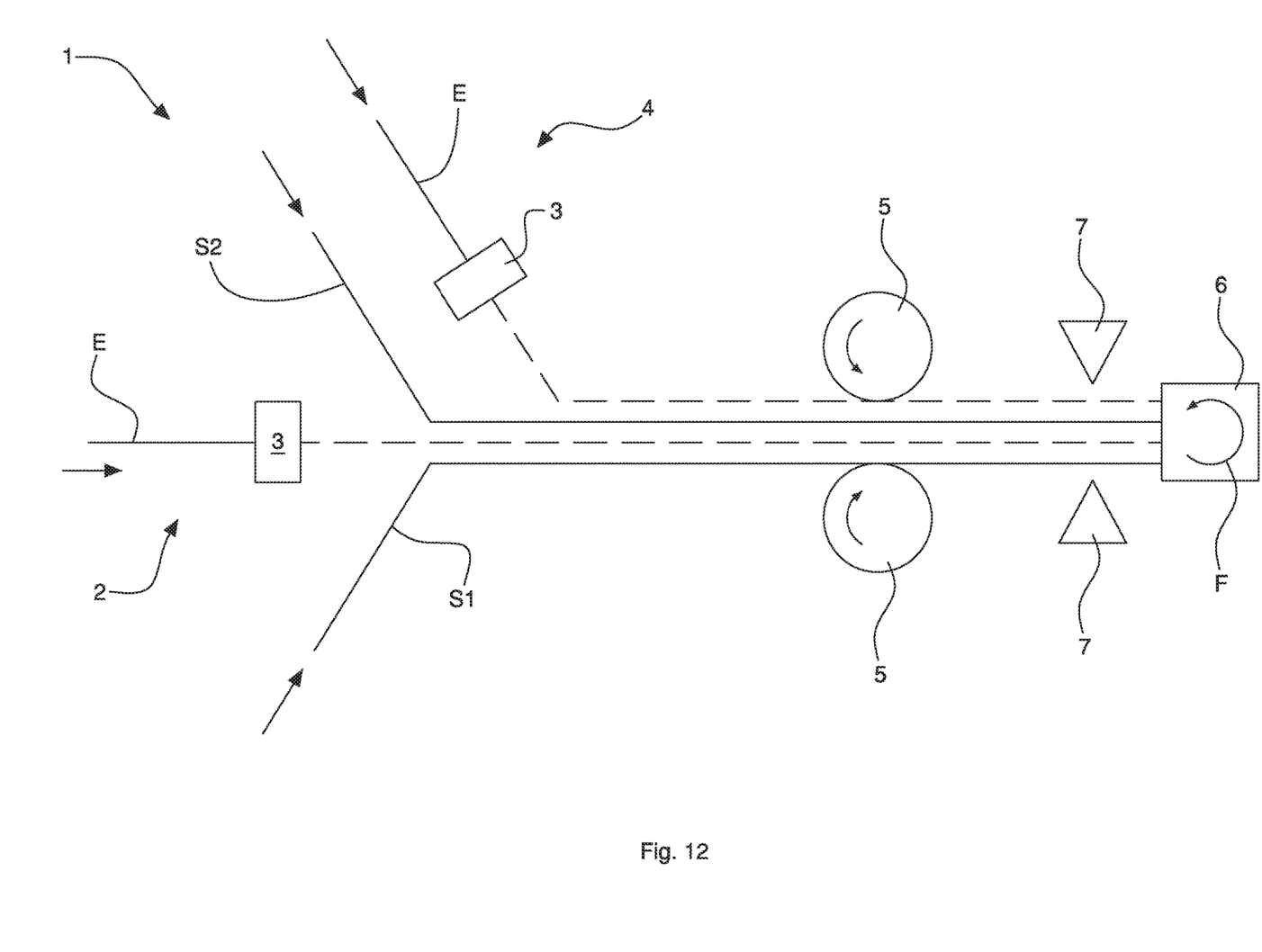
FIG. 12 is a diagram of a third embodiment of an assembly apparatus that is suitable for assembling electrodes for producing electric energy storage devices, according to the present invention.
Figure 15:
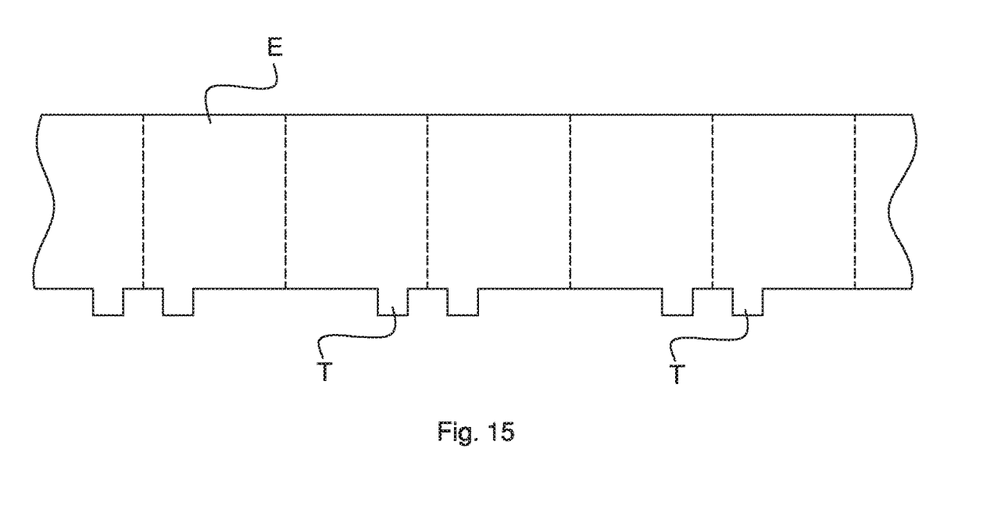
FIG. 15 shows one embodiment of a continuous electrode strip E that is usable in the apparatus of FIG. 12.

In FIG. 15, one embodiment of electrode strip E is illustrated that is usable in the apparatus of FIG. 12 for the single inserting device 2, in which the tabs T of the electrode strip E are arranged with a non-constant pitch, but in an alternating manner, such that the continuous electrode strip E can be cut to obtain electrodes with the tabs T having the eccentric arrangements in an alternating manner (an electrode with eccentric arrangement of the tab T to the right and the subsequent electrode with eccentric arrangement of the tab T to the left, then the right, and so on).

The programmable electronic control means of the assembly apparatus may be programmed so as to cause the aforesaid distances D1, D2, etc., in function of at least one datum relating to at least one dimension (in particular the thickness) of the first strip S1 and/or the second strip S2 and/or the electrodes with first polarity A1, A2, etc., and/or the electrodes with a second polarity C1, C2, etc. This datum/these data is/are entered into the memory of the control means and are then used by a processor to determine the aforesaid distances D1, D2, etc.

The aforesaid laminating step may be performed by the laminating device (rollers 5); the aforesaid winding step may be performed by the winding means 6; the aforesaid separating step may be performed by the separating device (cutting device 7); the separating device may be arranged, as in the specific embodiments disclosed here, along a continuous processing line between the laminating device and the winding means.

Figure 6:
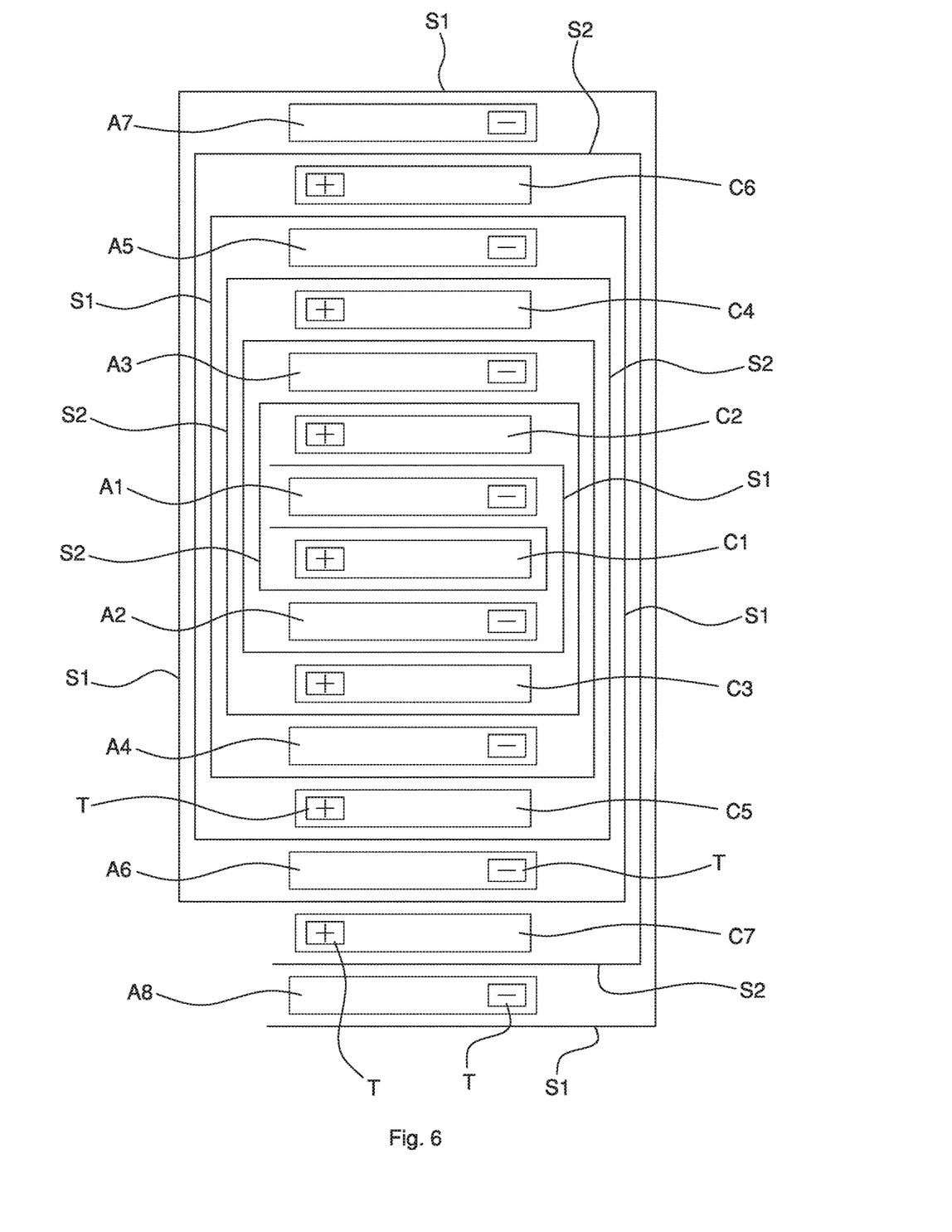
FIG. 6 shows a wound product obtained by the assembly method shown in FIGS. 2 to 5.

FIG. 6 shows one embodiment of an electrodes assembly that is makeable according to the method and/or the assembly apparatus of the invention. This assembly comprises a stack of electrodes (cathodes and anodes), at least five, or at least seven, or at least nine, or at least eleven, or at least thirteen electrodes in number (in the specific embodiment fifteen electrodes), which are superimposed on one another, with opposite alternating polarities to one another, and further comprising two continuous strips S1 and S2 of separator that are wound in a single winding direction and separate the electrodes from one another. Each strip S1 and S2 has a first winding start end in the innermost part of the stack and a second winding finish end outside the stack.

The invention claimed is:

1. An apparatus for assembling electrodes, said apparatus comprising:
    a first feed path with continuous motion of a first continuous separator strip (S1) and a second feed path with continuous motion of a second continuous separator strip (S2), said paths converging to an operative section where the first strip (S1) and second strip (S2) are superimposed on each other;
    inserting means (2) for inserting a succession of electrodes with first polarity between the first strip (S1) and the second strip (S2); and
    at least two distinct feeding devices (4) disposed on opposite sides of the strips (S1, S2) and configured to continuously provide and arrange a succession of electrodes with second polarity (C1, C2, C3, . . . , CN), one part on an outer side of the first strip (S1) and another part on an outer side of the second strip (S2), with the outer sides of the first strip (S1) and the second strip (S2) orientated away from each other, with the inner sides of the first strip (S1) and the second strip (S2) orientated towards each other, and with arrangements of the succession of electrodes with second polarity (C1, C2, C3, . . . , CN) alternating one on the first strip (S1) with respect to the other on the second strip (S2);
    wherein said inserting means comprises at least two distinct inserting devices (2) configured to insert electrodes with first polarity (A1, A2, A3, . . . , AN) with arrangements alternating one with respect to the other, wherein the electrodes with the first polarity (A1, A2, A3, . . . , AN) are inserted between said two strips (S1, S2), one after the other at reciprocal distances (D1, D2, . . . ) that progressively increase from the first electrode with first polarity (A1) to the last electrode with first polarity (AN), whereby the distance (D1) between the first and second electrodes with first polarity (A1 and A2) is less than the distance (D2) between the second and third electrodes with first polarity (A2 and A3) which in turn is less than the distance (D3) between the third and fourth electrodes with first polarity (A3 and A4), and so on for all electrodes with first polarity;
    wherein each of the electrodes with the first polarity (A1, A2, A3, . . . , AN) has a first tab (T) situated along one side of the electrode with the first polarity and each of the electrodes with the second polarity (C1, C2, C3, . . . , CN) has a second tab (T) situated along one side of the electrode with the second polarity, and
    wherein the first tab of each electrode (A1, A2, A3, . . . , AN) is spaced apart from the second tab of each electrode (C1, C2, C3, . . . , CN), respectively, along the direction of the length of the separator strips (S1, S2).

2. The apparatus according to claim 1, wherein, among said two distinct feeding devices (4), there is a first feeding device (4) arranged to feed electrodes with second polarity (C1, C3, C5, . . . ) on an outer side of the first strip (S1) and there is a second feeding device (4) arranged to feed electrodes with second polarity (C2, C4, C6, . . . ) on an outer side of the second strip (S2).

3. The apparatus according to claim 1, comprising laminating means (5) arranged on said operative section for laminating together the first strip (S1), the second strip (S2), the electrodes with first polarity and the electrodes with second polarity.

4. The apparatus according to claim 3, comprising winding means (6) arranged on said operative section for winding in a single winding direction (F) the laminated product exited by said laminating means (5) and making a wound product.

5. The apparatus according to claim 4, comprising separating means (7) arranged on said operative section between said laminating means (5) and said winding means (6) for separating the wound product from the rest of the laminated product.

6. An apparatus for assembling electrodes, said apparatus comprising:
- a first feed path with continuous motion of a first continuous separator strip (S1) and a second feed path with continuous motion of a second continuous separator strip (S2), said paths converging to an operative section where the first strip (S1) and second strip (S2) are superimposed on each other;
- inserting means (2) for inserting a succession of electrodes with first polarity between the first strip (S1) and the second strip (S2);
- at least two distinct feeding devices (4) disposed on opposite sides of the strips (S1, S2) and configured to continuously provide and arrange a succession of electrodes with second polarity (C1, C2, C3, ... CN), one part on an outer side of the first strip (S1) and another part on an outer side of the second strip (S2), with the outer sides of the first strip (S1) and the second strip (S2) orientated away from each other, with the inner sides of the first strip (S1) and the second strip (S2) orientated towards each other, and with arrangements of the succession of electrodes with second polarity (C1, C2, C3, ... CN) alternating one on the first strip (S1) with respect to the other on the second strip (S2), wherein each of the electrodes with the first polarity (A1, A2, A3, ... AN) has a first tab (T) situated along one side of the electrode with the first polarity and each of the electrodes with the second polarity (C1, C2, C3, ... CN) has a second tab (T) situated along one side of the electrode with the second polarity, wherein the first tab of each electrode (A1, A2, A3, ... , AN) is spaced apart from the second tab of each electrode (C1, C2, C3, ... , CN), respectively, along the direction of the length of the separator strips (S1, S2);
- laminating means (5) arranged on the operative section for laminating together the first strip (S1), the second strip (S2), the electrodes with first polarity and the electrodes with second polarity;
- winding means (6) arranged on said operative section for winding in a single winding direction (F) the laminated product exited by said laminating means (5) and making a wound product, and
- wherein in the wound product, the first tabs (T) are superimposed on one another, while the second tabs (T) are spaced from the first tabs (T) and are superimposed on one another.

7. The apparatus according to claim 6, wherein each of the first tab (T) and the second tab (T) is located in a non-central eccentric location on the respective electrode.

8. The apparatus according to claim 7, wherein the electrodes with the first polarity comprise a first set of odd ordinal position electrodes (A1, A3, A5, etc.) and a second set of even ordinal position electrodes (A2, A4, A6, etc.), wherein the first tabs (T) of the first set of odd ordinal position electrodes are located in a first eccentric location, while the first tabs (T) of the second set of even ordinal position electrodes are located in a second eccentric location spaced from and opposite the first eccentric location.

9. An apparatus for assembling electrodes, said apparatus comprising:
- a first feed path with continuous motion of a first continuous separator strip (S1) and a second feed path with continuous motion of a second continuous separator strip (S2), said paths converging to an operative section where the first strip (S1) and second strip (S2) are superimposed on each other;
- inserting means (2) for inserting a succession of electrodes with first polarity between the first strip (S1) and the second strip (S2);
- at least two distinct feeding devices (4) disposed on opposite sides of the strips (S1, S2) and configured to arrange a succession of electrodes with second polarity (C1, C2, C3, ... CN), one part on an outer side of the first strip (S1) and another part on an outer side of the second strip (S2), with the outer sides of the first strip (S1) and the second strip (S2) orientated away from each other, with the inner sides of the first strip (S1) and the second strip (S2) orientated towards each other, and with arrangements of the succession of electrodes with second polarity (C1, C2, C3, ... CN) alternating one on the first strip (S1) with respect to the other on the second strip (S2), wherein each of the electrodes with the first polarity (A1, A2, A3, ... AN) has a first tab (T) situated along one side of the electrode with the first polarity and each of the electrodes with the second polarity (C1, C2, C3, ... CN) has a second tab (T) situated along one side of the electrode with the second polarity, wherein the first tab of each electrode (A1, A2, A3, ... , AN) is spaced apart from the second tab of each electrode (C1, C2, C3, ... , CN), respectively, along the direction of the length of the separator strips (S1, S2), in which the first tabs alternate sides on the electrodes with first polarity, while the second tabs are all aligned on the same side of the electrodes with second polarity;
- laminating means (5) arranged on the operative section for laminating together the first strip (S1), the second strip (S2), the electrodes with first polarity and the electrodes with second polarity; and
- winding means (6) arranged on said operative section for winding in a single winding direction (F) the laminated product exited by said laminating means (5) and making a wound product,
- wherein in the wound product, the first tabs (T) are superimposed on one another, while the second tabs (T) are spaced from the first tabs (T) and are superimposed on one another.

* * * * *